Figure 1:
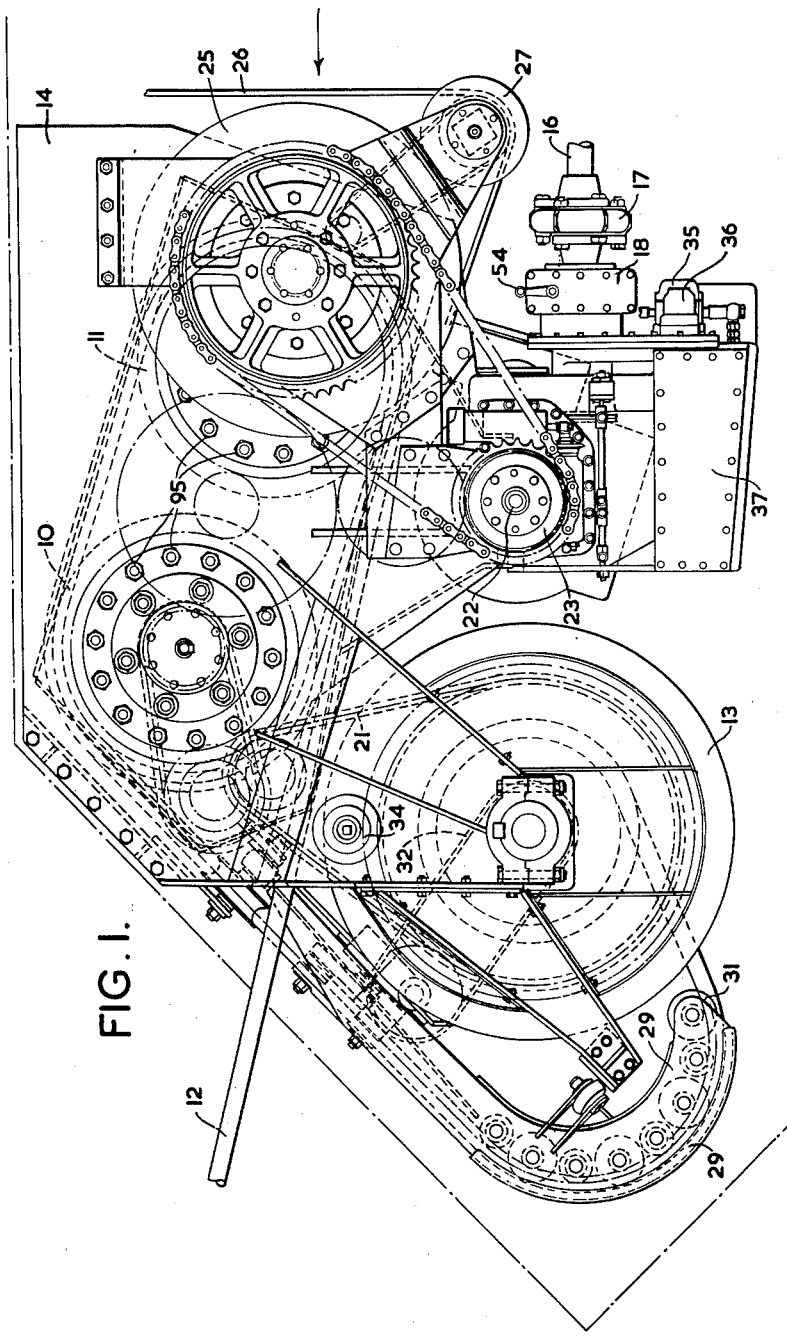

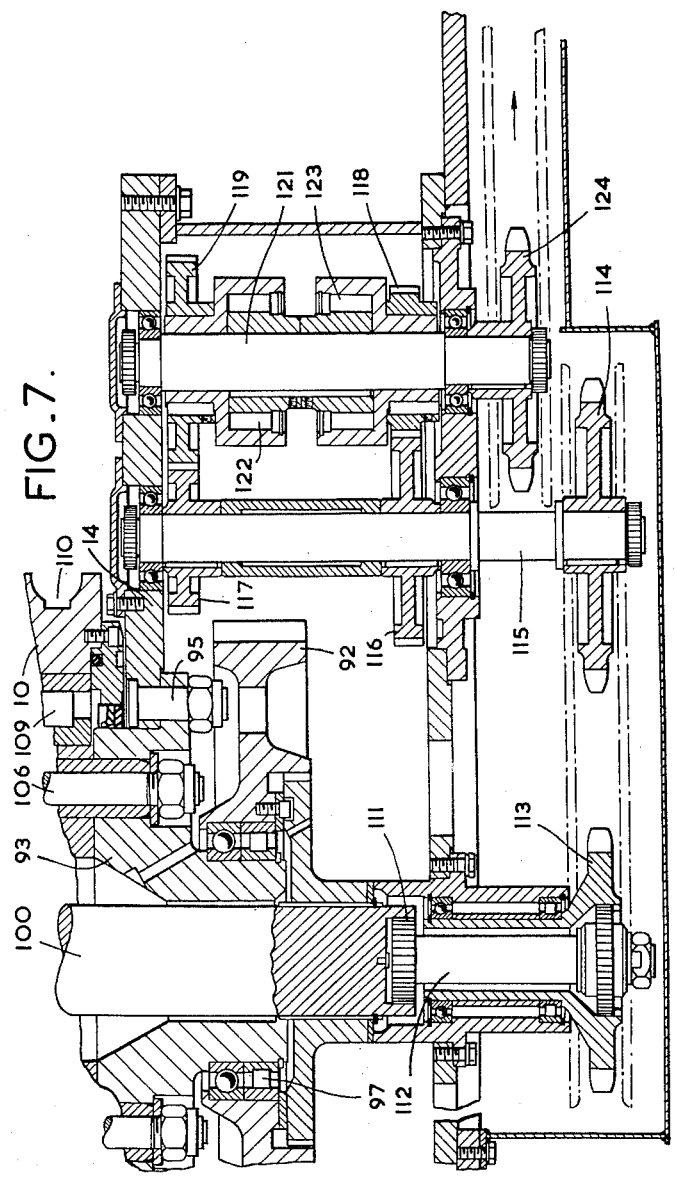

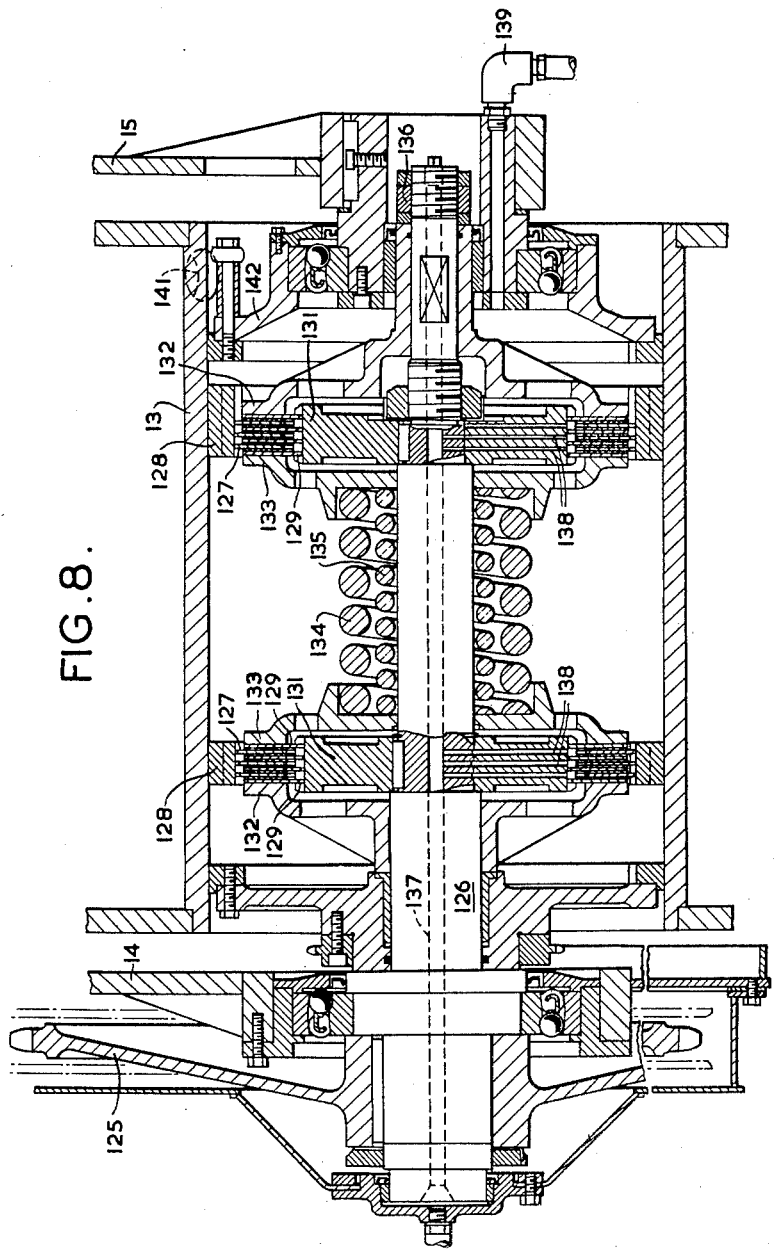

FIG. 10.

United States Patent Office 3,066,917
Patented Dec. 4, 1962

3,066,917
WINCHES
William Alfred Tuplin, Sheffield, Edwin Alexander Gwinnett, Walsall, and Harold William Jenkins, Wednesbury, England, assignors to Rubery, Owen & Company Limited, Wednesbury, England, a British company
Filed Sept. 24, 1959, Ser. No. 842,022
Claims priority, application Great Britain Sept. 26, 1958
2 Claims. (Cl. 254—175.7)

This invention relates to improvements in power driven winches and more particularly to portable winches adapted to be mounted on a vehicle and to be driven by the engine of the vehicle or by a separate power unit carried by the vehicle.

One object of our invention is to provide a winch which is of relatively light weight for its capacity and in which overloading of the winch is automatically prevented.

Another object of our invention is to provide a winch which is extremely simple to operate and control.

In a winch the rope or cable is normally stored on a reeling or storage drum on which it is wound either directly or after being taken round one or more capstan drums. When a rope or cable is wound on to a drum the effective diameter of the drum increases progressively as the rope or cable passes on to the drum, and the linear speed of and/or the tension in the rope or cable increases unless the speed of rotation of the drum is progressively reduced. Similarly, when the rope or cable is being drawn off from the drum, as for example in lowering a load, the effective diameter decreases progressively and the linear speed of the rope or cable is reduced unless the speed of the drum is progressively increased. These changes in linear speed give rise to variations in the tension in the rope or cable depending on the load.

According to one feature of our invention, a storage drum in a winch is driven through a two-speed gear-box and a slipping clutch which is arranged either to slip at a predetermined torque or to be automatically adjusted to slip at a torque proportional to the amount of rope or cable on the drum so that the torque applied to the drum or the linear speed of a rope or cable wound on the drum is automatically maintained within predetermined limits both when winding in and reeling out.

The two-speed gear-box preferably incorporates two oppositely acting free wheels through which the two gear trains act so that constant mesh gears can be used and the appropriate gear ratio is selected automatically according to the direction of rotation of the drum.

If the clutch is arranged to slip at a predetermined torque, the gear ratio selected when winching in is such that when the drum is empty there is negligible slip of the clutch, and as the effective diameter increases, the slip increases, the torque on the drum being kept within the limit determined by the loading of the clutch.

When reeling out the other gear ratio is used, and is such that initially, when the drum is full, there is negligible slip of the clutch and there is increasing slip as the effective diameter decreases.

The clutch is set to slip at a torque such that the tension in the rope or cable is never above or below a predetermined value, whichever is the more important in the particular application.

In an alternative arrangement the tension in the rope or cable is maintained substantially constant by varying the torque at which the clutch slips. This may be effected by varying the load on the clutch plates in accordance with the effective diameter of the drum. For example, the load on the clutch plates may be controlled through mechanical, hydraulic or electric means by a pivotal arm carrying a roller engaging with the rope or cable on the drum, the angular position of the arm varying with the number of layers of rope or cable on the drum.

According to a further feature of our invention, in a winch of the capstan type a storage drum for the rope or cable driven in the manner described above is combined with two capstan drums around which the rope or cable is passed a number of times between the storage drum and the load so that the tension in the rope or cable at the storage drum is very substantially lower than the tension between the capstans and the load.

The capstans are conveniently driven through an epicyclic gear-box providing different gear ratios for winching in and reeling out, the input shaft which is coupled through gearing to the power unit always rotating in the same direction while the output shaft from which the capstan drums are driven rotates in one direction at one speed for winching in, and in the opposite direction at a lower speed for reeling out when the output shaft is being driven by the load and the power unit is being used to control the speed of reeling out.

The epicyclic gear-box is conveniently mounted on trunnions, the torque being taken by means which indicate continuously the torque transmitted and which, when a predetermined torque is exceeded, actuate a warning device and may also interrupt the drive so that overloading of the winch is automatically prevented.

According to another feature of our invention, in a capstan winch the capstan drums are mounted between spaced parallel side plates in such a manner that the mountings for the drums constitute rigid transverse members which stiffen the structure and enable it to be of considerably less weight for a given capacity than would otherwise be possible.

Each capstan drum is conveniently driven through reduction gearing housed within the drum itself.

According to a further feature of our invention, the winch incorporates an auxiliary winch for light work and for taking out the main rope or cable to a load, the auxiliary winch drum which carries a light rope or cable being driven from the same power unit through a separate selector gear-box.

A single control is preferably provided for the main winch and the auxiliary winch, a lever handle controlling fluid pressure means which actuate selector mechanism in the gear-boxes for winching in and out with the main winch and auxiliary winch, independently, and for free spooling when pulling the main cable out.

Figure 2:
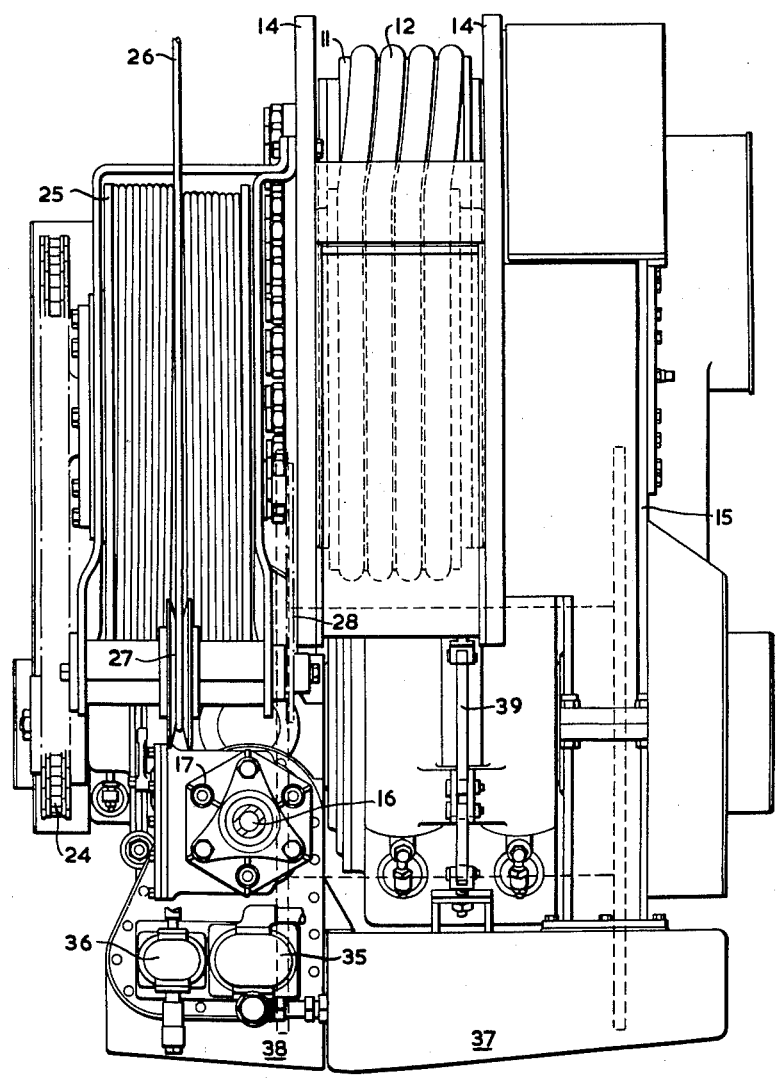
Figure 3:
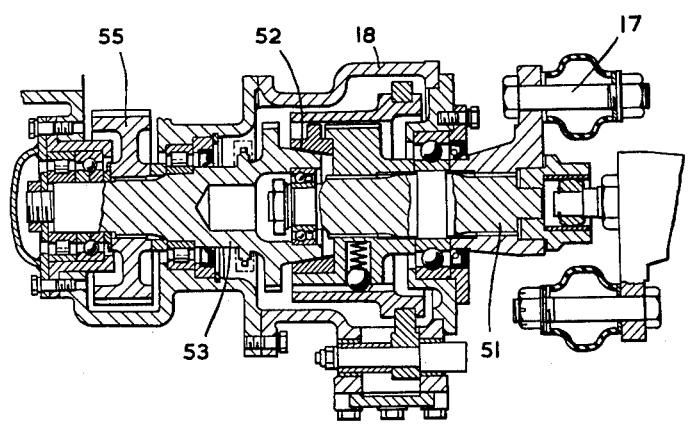
Figure 9:
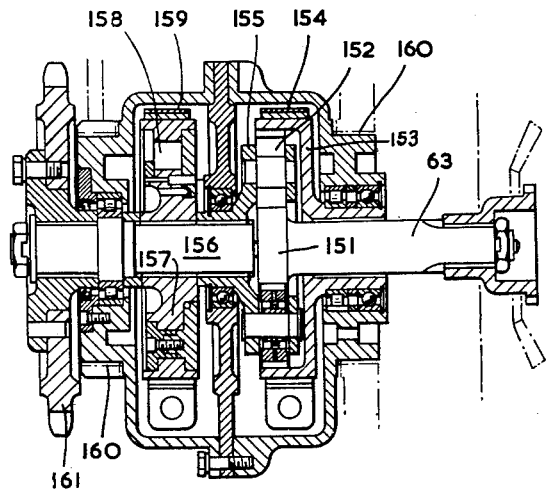
Figure 4:
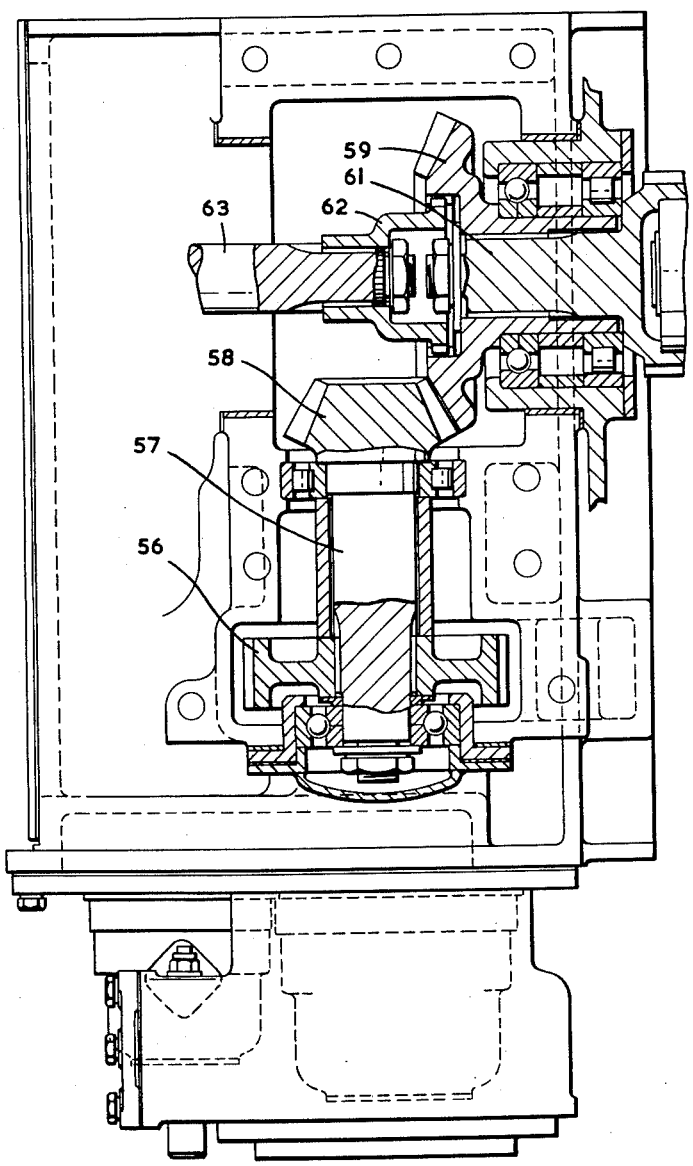
Figure 5:
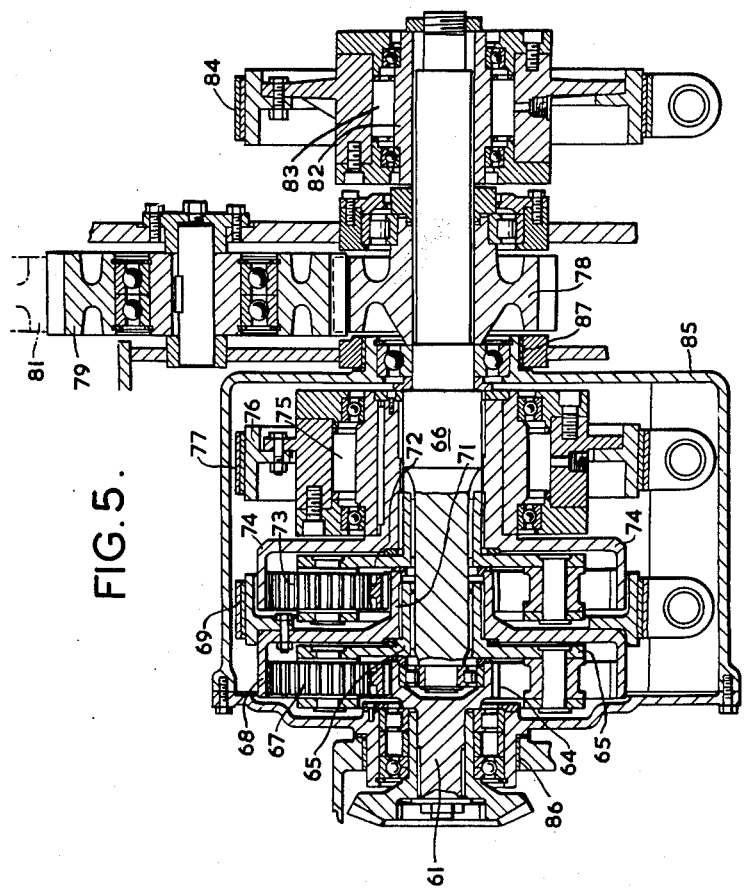
Figure 6:
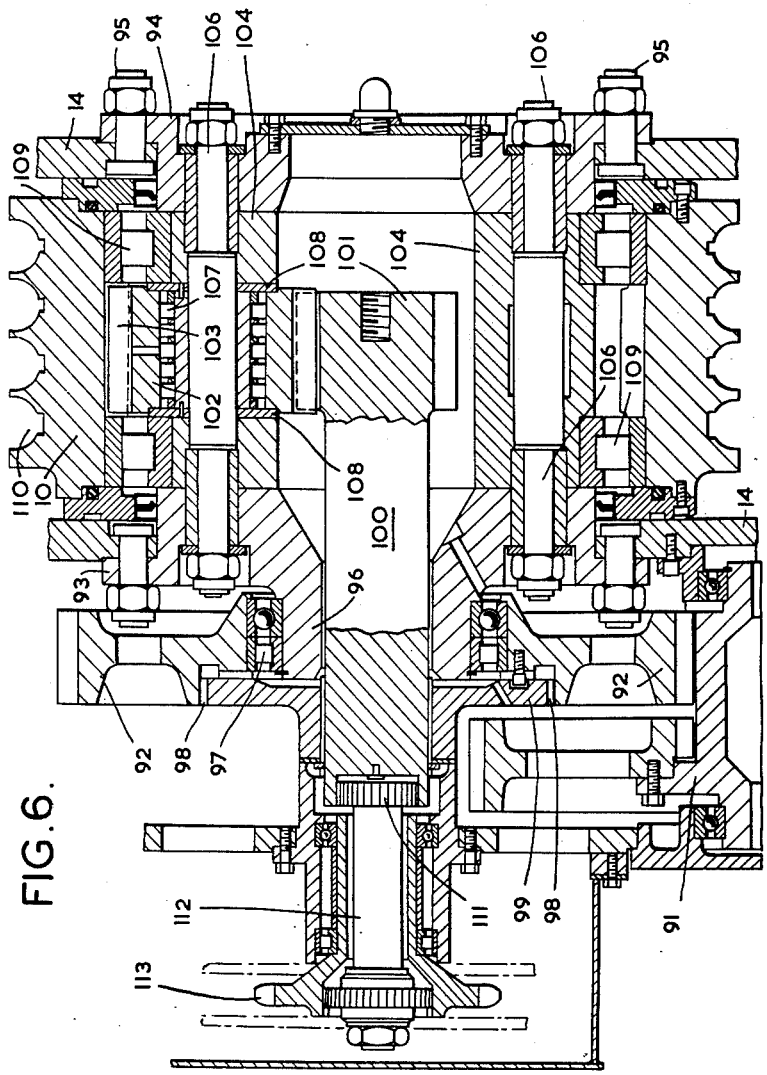
Figure 11:
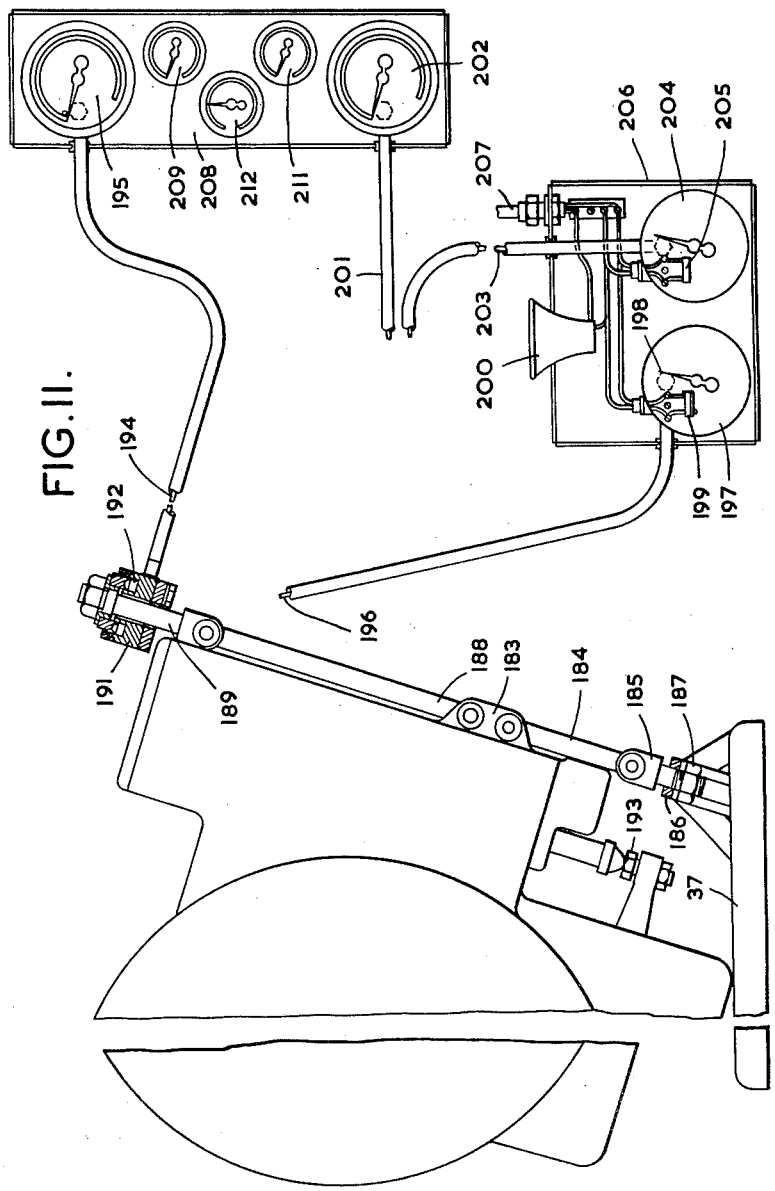
Figure 12:
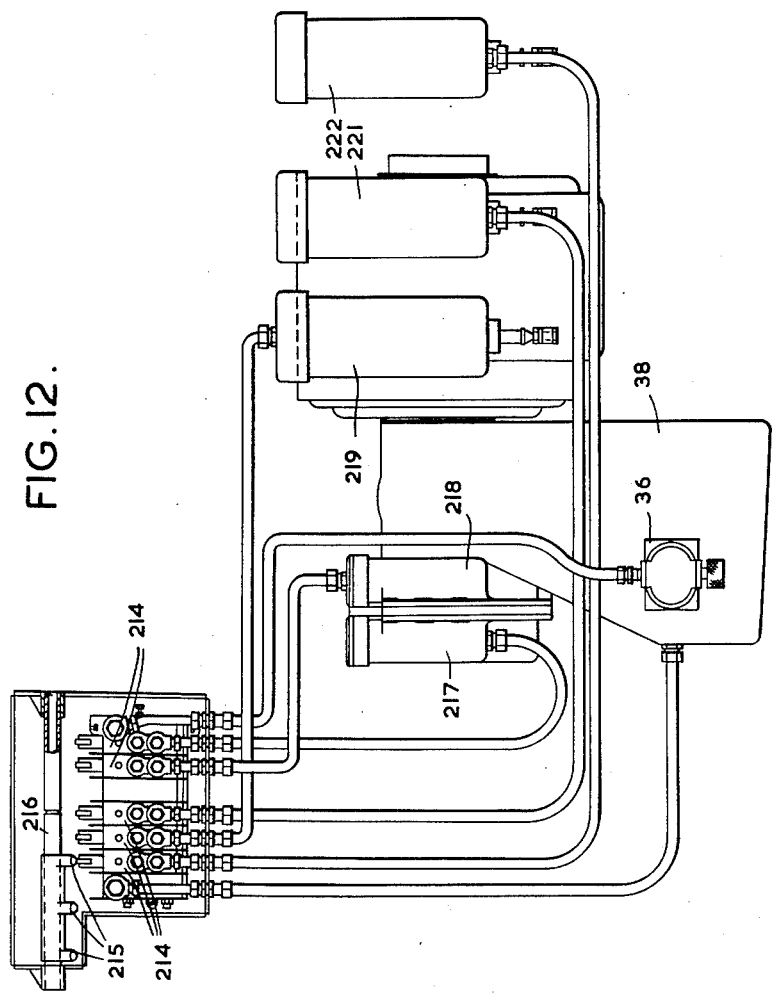

A winch embodying our invention is illustrated by way of example in the accompanying drawings in which:

FIGURE 1 is a side elevation of the complete winch,
FIGURE 2 is an end elevation of the winch looking in the direction of the arrow in FIGURE 1,
FIGURE 3 is a section of the input gearing assembly,
FIGURE 4 is a section of the gearing between the input assembly and the main selector gear-boxes,
FIGURE 5 is a section of the main selector gear-box,
FIGURE 6 is a section of one of the capstan drums and its drive,
FIGURE 7 is a section of the drive for the storage drum,
FIGURE 8 is a section of the storage drum and the slipping clutch through which it is driven,
FIGURE 9 is a section of the gear-box through which the auxiliary winch is driven,
FIGURE 10 is a section of the auxiliary winch drum,
FIGURE 11 is a diagrammatic view showing the layout of the means for taking and indicating the torque on the main gear-box, and
FIGURE 12 is a diagrammatic view showing one form of single lever control.

The winch illustrated is designed to be mounted on a vehicle and to be driven from the engine of the vehicle through a power take off or other convenient means for transmitting the drive. The winch comprises a main winch for handling a heavy main cable and an auxiliary winch for light work or for taking out the main cable.

The main winch essentially comprises two spaced capstan drums 10, 11 around which the cable 12 is taken a number of times, and a storage drum 13 on which the cable is stored. The capstan drums and a main gear-box through which they are driven are mounted between two spaced parallel side plates 14. The storage drum and main gear-box are mounted between one of the side plates and a parallel plate 15, the drum being offset from the capstan drums to an extent such that the cable coming from the second capstan drum is substantially in the central plane of the storage drum.

The input shaft 16 which is driven by the engine of the vehicle drives through a flexible coupling 17 and an input gear-box 18 a main gear-box from which the capstan drums are driven, and the storage drum 13 is driven by a chain 21 from two-speed spur gearing taking its drive from one of the capstans. An output shaft 22 from the gearing on the opposite side to the drive for the capstans carries a sprocket 23 from which is driven through a chain 24 the auxiliary winch drum 25 on which is wound a light cable 26. The cable 26 is guided by a grooved pay-on pulley 27 movable in a direction parallel to the axis of the drum by mechanism driven by a chain 28.

The main cable 12 is guided on to and off from the storage drum by a curved pay-on arm 29 carrying a number of angularly spaced grooved pulleys 31, the arm being reciprocated to and fro relative to the drum by worm and crank mechanism driven by a chain 32 from the drum 13.

Hand-operated mechanism 34 is provided for rotating the storage drum independently of the capstan drums under certain circumstances such as when fitting a new cable.

FIGURES 1 and 2 also show gear-pumps 35 and 36 for circulating lubricating oil and providing pressure fluid for the hydraulically operated controls for the winch, a sump 37 for lubricating oil, a sump 38 for pressure fluid, and means 39 for taking the torque on the main gear-box which is trunnion mounted.

All the gearing referred to above is described in detail below, with reference to the other figures of the drawings.

In FIGURE 3, which shows the input gearing assembly, 17 is the flexible coupling connected to the input shaft 16 and referred to above. Through the coupling is driven a shaft 51 which is coupled through a cone or other disengageable coupling 52 to an aligned output shaft 53. The coupling is controlled by a lever 54 seen in FIGURE 1. The shaft 53 carries a helically toothed gear wheel 55 which meshes with a mating wheel 56 (FIGURE 4), splined on a shaft 57. The shaft 57 carries a bevel pinion 58 meshing with a bevel wheel 59 on a shaft 61 at right angles to the shaft 57. The shaft 61 is coupled through a gear coupling 62 to an aligned shaft 63 from which the auxiliary winch drum is driven.

The shaft 61 is the input shaft of the main gear-box which is shown in FIGURE 5 and which incorporates two epicyclic gear trains and a holding brake.

The sun wheel 64 of the first epicyclic train is carried by the shaft 61 and the planet carrier 65 is splined on the output shaft 66. The planet wheels 67 mesh with an annulus 68 controlled by a holding band 69. The annulus 68 carries or is integral with the sun wheel 71 of the second train of which the planet carrier 72 is also splined on the output shaft 66. The planet wheels 73 of this train mesh with an annulus 74 coupled through a free wheel 75 to a ring 76 controled by a holding band 77.

An output gear wheel 78 on the shaft 66 meshes with an idler gear-wheel 79 which in turn meshes wtih a gear-wheel 81 through which the capstan drums are driven.

An extension of the shaft 66 has keyed on its a disc 82 coupled through a free wheel 83 to a ring controlled by a brake band 84 and constituting a one-way brake for the output shaft.

The holding band 69 is spring-loaded to the off or released position and is applied by a fluid pressure cylinder under the control of the operator, and the holding band 77 and brake band 84 are spring-loaded to the on or engaged position and are released by fluid pressure cylinders.

When winching in, that is when pulling a load in with the winch, as for example pulling a load up a slope, the holding band 69 is on, and the input shaft 61 drives the output shaft 66 through the planet wheels 67 and the carrier 65, the other train and the brake being inoperative owing to the free-wheels 75 and 83. The input and output shafts both rotate in the same direction.

When lowering a load, the brake band 84 and the holding band 69 are released and the load drives the output shaft 66 in the reverse direction. The annulus 74 is locked through the free-wheel 75 and holding band 77, and the shaft 66 drives through the planet carrier 72 of the second train and the planet wheels 73 to the sun wheel 71 and annulus 68 of the first train of which the planet carrier 65 is rotating with the shaft 66. The annulus 68, through the planet wheels 67, drives the sun wheel 64 and shaft 61 in the normal direction but at a considerably lower speed than normal.

When winching in, the brake band 84 is on, the free-wheel 83 allowing the output shaft to rotate freely in the forward direction, but if winching in is stopped the brake holds the shaft against rotation in the reverse direction to hold the load.

If winching in is stopped by moving the control lever into neutral, the brake band remains on but is released when the control lever is moved into the load lowering position. However, the freewheel 75 has allowed the reverse band 77 to remain on when winching in so that the reverse drive is immediately operative and there is no risk of the load slipping or being lost through a time lag in the response of the hydraulic controls for the bands. This is important as in cold weather the viscosity of the hydraulic fluid might lead to a time lag, and if the brake band were released before the reverse drive became operative, there might be a substantial downward movement of the load.

The shaft 61 is coupled through the input gearing described above to the engine which is used as a brake to control the outward movement of the cable under load, and owing to the substantial gear reduction through the two epicyclic trains when lowering a load, ample control is available.

The gear-box 85 housing the epicyclic gearing is mounted for angular movement in trunnion bearings 86 and 87 and the reaction torque is taken by hydraulic means which indicate the torque transmitted and may operate a warning device and disengage the drive if a predetermined torque is exceeded as described below.

Continuing with the description of the driving mechanism, the gear wheel 81 referred to above drives a pinion 91 (FIGURE 6) meshing with large gear-wheels 92 by which the capstan drums are driven, and as the drives to the two drums are identical, only one need be described. A capstan drum and its drive are shown in FIGURE 6.

The drum 10 is mounted between the spaced parallel side plates 14 in mountings so arranged that they constitute rigid transverse members which stiffen the structure. Flanged hubs 93, 94 are received in aligned openings in the side plates to which they are secured by angularly spaced bolts 95. The hub 93 has a hollow spigot extension 96 carrying bearings 97 for the gear-wheel 92 which is coupled by a gear coupling 98 to a disc 99 keyed on a shaft 100 extending axially through the hub into the interior of the drum. The inner end of the shaft is formed as a pinion 101 meshing with three angularly spaced planet wheels 102 which mesh with an internal ring gear 103 in the capstan drum. The planet wheels are housed in part-circular recesses in a rigid hollow cylindrical planet carrier 104 of which the axial length is equal to the spacing between the inner faces of the hubs 93, 94 so that the hubs and the planet carrier can be clamped up tightly to form a rigid structure by angularly spaced bolts 106 passing through the hubs and planet carrier parallel to the axis of the shaft.

The planet wheels 102 are rotatably mounted on roller bearings 107 on three of the bolts 106, the inner races of the bearings together with end washers 108 forming spacing sleeves between the inner faces of the recesses in the carrier in which the planet wheels are housed.

The planet carrier 104 also carries at each end the inner races of roller bearings 109 for the capstan drum.

The drive provides a 4-to-1 reduction between the shaft 100 and the capstan drum, and the semi-floating mounting of the shaft equalises the loading of the planet wheels.

The drum is formed with a series of peripheral grooves 110 for the main cable.

The shaft 100 through which one of the capstan drums is driven is coupled through a gear coupling 111 to an axially aligned shaft 112 carrying a sprocket 113 from which the gear-box for the storage drum is driven. This gear-box is shown in FIGURE 7.

From the sprocket 113 a chain takes the drive to a sprocket 114 (FIGURE 7) on an input shaft 115. Keyed on this shaft are large and small gear wheels 116, 117 in constant mesh respectively with small and large gearwheels 118, 119 mounted on a parallel output shaft 121 to which they are coupled by oppositely acting free-wheels 122 and 123. The output shaft 121 carries a sprocket 124 from which the storage drum 13 is driven by a chain through the means shown in FIGURE 8.

The chain drives a large sprocket 125 keyed on a shaft 126 on which the drum 13 is rotatably mounted (FIGURE 8). The drum is coupled to the shaft by a clutch formed in two parts each comprising a series of plates 127 slidably keyed to an internal ring 128 in the drum and alternating with the plates 129 slidably keyed on a boss 131 fixed on the shaft. A disc 132 mounted on the shaft is located on the outer side of the plates, and axial pressure is applied to the plates by a pressure disc 133 located on their inner side and axially slidable on the shaft. The pressure discs 133 are loaded by concentric compression springs 134 and 135 mounted between them and fitting over the shaft.

The clutch is designed to slip at a predetermined torque which can be adjusted by moving axially, by means of a nut 136 screwed on to the end of the shaft 126, one of the discs 132 which is slidably mounted on the shaft.

The clutch is cooled by oil from the main lubrication system fed under pressure to an axial bore 137 in the shaft and flowing outwardly through radial passages 138 in the bosses 131 over the clutch plates. The oil thus passes into the drum which is kept partially full of oil, the surplus being drawn off through one or more outlets 139 in an end bearing assembly.

The inner end of the cable is taken in through an opening 141 in the drum and secured by any convenient anchorage means to a spider 142 carrying one end of the drum.

The drive to the storage drum is taken through the gears 116 and 118 (FIGURE 7) when winching in, the free wheel 122 allowing the gear wheel 119 to rotate idly on its shaft 121. When winching out or pulling the cable out from the winch, the drive to the storage drum is taken through the gears 117 and 119 so that the drum is driven at a lower speed of rotation.

The speeds at which the drum is driven through the respective gears are such that when winching in there is a minimum slip of the clutch in the drum when the drum is empty, the slip increasing progressively so that the speed or rotation of the drum is reduced progressively as the cable is wound on to the drum and its effective diameter increases.

When lowering a load the speed is such that when the drum is full there is no appreciable slip of the clutch and the slip increases progressively as the cable is payed out.

This arrangement ensures that an appropriate tension is maintained in the cable between the storage drum and the capstans in both directions of movement of the cable.

The auxiliary winch drum 25 is driven from the shaft 63 shown in FIGURE 4 as being coupled to the shaft 61 in the input gear-box in advance of the main gearbox.

The drive is taken through an epicyclic gear-box shown in FIGURE 9. The shaft 63 carries a sun pinion 151 meshing with planet wheels 152 which mesh with an annulus 153 controlled by a holding band 154 which is spring-loaded to the off position. The drive is normally through the planet wheels and their carrier 155 to the output shaft 156 on which the carrier is keyed. A disc 157 splined on the shaft is coupled through a freewheel 158 to a ring controlled by a brake band 159 which is spring-loaded to the on position. Both bands are actuated by fluid pressure means controlled from the main control lever.

When winching in, the holding band 154 and the brake band 159 are both in the holding position but the free wheel 158 allows the output shaft to be driven through the planet wheels 152 and carrier 155, the brake coming into operation automatically when the control lever is moved into neutral.

When it is desired to draw cable off the drum the brake band 159 is released so that the output shaft 156 is free to rotate in the unwinding direction, the holding band 154 being in the released position.

The gear-box is mounted in trunnion bearings 160 and the reaction torque is taken by hydraulic means which indicate the torque transmitted and may operate a warning device when a predetermined torque is exceeded as described more fully below.

The output shaft 156 carries a chain sprocket 161 from which the auxiliary drum is driven by a chain and internal gearing similar to that used for driving the capstan drums.

As shown in FIGURE 10, the chain drives a large chain sprocket 162 fixed on a shaft 163 which extends axially into the drum 25. The inner end of the shaft is formed as a pinion or sun wheel 164 meshing with planet wheels 165 which in turn mesh with an internal ring gear 166 in the drum. The planet wheels are rotatably mounted on spindles 167 in a stationary carrier 168.

The light rope or cable 26 which is wound on the drum is guided by the grooved pay-on pulley 27 which is rotatable on a block 171. The block has an axial opening of square cross-section sliding on a hollow stationary guide 172 of complementary section parallel to the axis of the drum. A radial follower 173 in the block passing through a longitudinal slot in the guide 172 engages at its inner end in intersecting helical grooves 174 of opposite hand in a spindle 175 rotatably mounted in the guide 172 so that as the spindle rotates the block and pulley are reciprocated to and fro across the width of the drum. The spindle has a sprocket 176 on one end and is driven by a chain 28 from a sprocket 177 on a spindle 178 which is rotatably mounted in a frame plate and carries a gear wheel 179 meshing with a pinion 181 on the drum.

The mounting of the pulley 27 on the block 171 which is slidable on a guide of square cross section counteracts the torque and relieves the spindle 175 of bearing load.

The drum 25 may conveniently be fabricated from sheet metal pressings or stampings welded together.

FIGURE 11 shows diagrammatically the layout of the means for taking the torque on the main gear-box and for indicating when a predetermined torque is exceeded.

A lug 183 on one side of the gear-box is coupled by a link 184 to a fork end 185 of which the stem is adjustable by means of a nut 187 screwed on to the stem of the fork end. The lug 183 is also connected by an aligned tension link 188 to a rod 189 forming one part of an hydraulic capsule 191 of which the other part is fixed on the frame. Thus when the gear-box is transmitting a torque and tends to move angularly in its trunnion bearings, this movement is resisted by liquid in the pressure space 192 of the capsule. The adjustment 187 allows a preload to be put on the liquid in the hydraulic capsule.

The pressure space 192 in the hydraulic capsule is connected by an armoured pipe 194 to a pressure gauge 195 which may be graduated to indicate directly the torque transmitted through the gear-box or the tension in the main cable. The pressure space is also connected by a pipe 196 to a gauge 197 of which the pointer 198 closes a micro-switch 199 when a predetermined pressure corresponding to a maximum allowable cable load is reached. The closing of this switch operates an audible warning device 200 and may also be arranged to operate a relay which moves the control lever for the winch into neutral or other wise interrupts the drive.

A similar layout is conveniently used for taking and indicating the torque transmitted through the gear-box through which the auxiliary winch drum is driven, the hydraulic capsule for that gear-box being connected by a pipe 201 to a pressure gauge 202 and by a pipe 203 to a gauge 204 actuating a micro-switch 205 in parallel with the switch 199. The gauges 197 and 204 are conveniently located in a housing 206 to which electric current is taken through a conduit 207.

The gauges 195 and 202 are mounted on an instrument panel 208 which also carries a gauge 209 showing the pressure in the hydraulic control system, a gauge 211 indicating the pressure in the lubrication system, and a thermometer 212 showing the temperature of the lubricating oil.

All the operations of the winch are controlled by a single lever handle actuating valves which effect the connection to the pressure fluid system supplied by the pump and to exhaust of hydraulic cylinders actuating the holding bands and brake bands in the epicyclic gear-boxes for the main and auxiliary winches.

In the layout shown diagrammatically in FIGURE 12, the valves 214 which may be of any convenient type are actuated by cams 215 on an axially and angularly movable selector shaft 216. The valves selectively control the supply of pressure fluid to a cylinder 217 actuating the holding band in the gear-box for the auxiliary winch, a cylinder 218 actuating the brake band in that gear-box for winching in with the auxiliary winch, a cylinder 219 actuating the band in the main gear box for the forward or winching in drive in the main gear-box, and a cylinder 221 actuating the band in the main gear-box for the winching out or reverse drive in the main gear-box, and a cylinder 222 actuating the band of the holding brake in the main gear box.

The selector shaft 216 is actuated by a lever handle working in a gate having five positions corresponding respectively to winching in with the auxiliary winch, reeling out with the auxiliary winch, winching in with the main winch, lowering a load with the main winch, and free spooling—that is allowing the cable to be drawn freely out as for example when moving a load by successive pulls through a distance greater than the length of the cable.

The lever handle is preferably spring-biassed to one end of its gate and is so arranged that when it is moved to bring either winch into operation, it is moved in the direction in which the rope or cable will move.

To facilitate the replacement of a heavy cable which has broken at a point outside the winch, the inner end of the cable may be attached to a light pilot rope or cable which is wound on the drum below the main cable and which is of sufficient length to allow its outer end to pass off the capstans while its inner end is still attached to the drum. Thus if the main cable breaks the part left on the winch can be drawn off, after freeing the drive for the capstans and storage drum, until the end of the pilot rope is accessible. The broken cable can then be disconnected from the pilot rope and a fresh cable can be attached and wound on to the capstans, and storage drum. The connection between the pilot rope and the main cable may be formed by a coupling of the known type comprising a contracting braided sleeve so that the diameter of the coupling is not appreciably greater than that of the cable.

As the diameter of the pilot rope will be substantially less than that of the main cable, the storage drum can be rotated during this operation by the hand operated mechanism 34 to maintain a degree of slack.

In an alternative arrangement means may be provided for feeding the broken part of the cable off the drum at its inner end so that a new cable can be secured to the outer end of the broken cable and drawn round the capstans and on to the storage drum in the normal way.

We claim:
1. A winch comprising two capstan drums around which a cable is taken a plurality of times, a storage drum on which the cable is wound, a power unit, two-speed epicyclic gearing drivably coupling said power unit to said capstan drums, two-speed spur gearing and a slipping clutch drivably coupling said power unit to said storage drum, said two-speed spur gearing comprising two pairs of constant-mesh gears of different ratios and oppositely acting free wheels through which said gears are coupled to the output shaft of the gear-box whereby different gear ratios for the drive are automatically selected according to the direction in which the drum is driven.

2. A winch comprising two capstan drums around which a cable is taken a plurality of times, a storage drum on which the cable is wound, a power unit, two-speed epicyclic gearing drivably coupling said power unit to said capstan drums, two-speed spur gearing and a slipping clutch drivably coupling said power unit to said storage drum, spaced parallel side plates between which said capstan drums are mounted, an internal ring gear in each of said capstan drums, a shaft extending axially into the drum, a pinion on said shaft, planet wheels meshing with said pinion and ring gear, a planet carrier in which said planet wheels are rotatably mounted, flanged hubs rigidly secured in said side plates, and means for rigidly clamping said planet carrier between said hubs.

References Cited in the file of this patent

UNITED STATES PATENTS

| | | |
|---|---|---|
| 980,220 | Eastman | Jan. 3, 1911 |
| 1,000,084 | Frederickson | Aug. 8, 1911 |
| 1,060,165 | Cole | Apr. 29, 1913 |
| 1,084,577 | Halbleib | Jan. 13, 1914 |
| 1,140,132 | Dorsey | May 18, 1915 |
| 1,364,579 | Noble | Jan. 4, 1921 |
| 1,578,965 | Eck | Mar. 30, 1926 |
| 1,661,275 | Stensland | Mar. 6, 1928 |
| 2,019,755 | Zerbe et al. | Nov. 5, 1935 |
| 2,247,498 | Hunt | July 1, 1941 |
| 2,353,814 | De Pew | July 18, 1944 |
| 2,402,756 | Lawler | June 25, 1946 |
| 2,422,274 | Wilson | June 17, 1947 |
| 2,757,883 | Schlang et al. | Aug. 7, 1956 |
| 2,900,145 | Hanson | Aug. 18, 1959 |

FOREIGN PATENTS

| | | |
|---|---|---|
| 687,056 | France | Apr. 22, 1930 |
| 627,307 | Great Britain | Aug. 5, 1949 |